(12) United States Patent
Beasley et al.

(10) Patent No.: US 8,870,305 B2
(45) Date of Patent: Oct. 28, 2014

(54) TRACK ROLLER ASSEMBLY HAVING ADJUSTABLE IDLER WHEEL

(75) Inventors: Christopher R. Beasley, East Peoria, IL (US); Fernando Carrillo, Metamora, IL (US); Joshua L. Nuechterlein, Washington, IL (US); Amber B. Lass, Charlottesville, VA (US)

(73) Assignee: Caterpillar Inc., Peoria, IL (US)

( * ) Notice: Subject to any disclaimer, the term of this patent is extended or adjusted under 35 U.S.C. 154(b) by 419 days.

(21) Appl. No.: 13/331,979

(22) Filed: Dec. 20, 2011

(65) Prior Publication Data

US 2013/0154347 A1 Jun. 20, 2013

(51) Int. Cl.
*B62D 55/30* (2006.01)

(52) U.S. Cl.
USPC .......................................... 305/153; 305/143

(58) Field of Classification Search
CPC ............................... B62D 55/30; B62D 55/305
USPC .................. 305/136, 141, 143, 150, 153, 156
See application file for complete search history.

(56) References Cited

U.S. PATENT DOCUMENTS

| 2,926,969 | A | * | 3/1960 | Ashley, Jr. | ................... | 180/9.52 |
| 3,156,505 | A | * | 11/1964 | Hubert | ........................... | 305/154 |
| 3,382,013 | A | | 5/1968 | Toth et al. | | |
| 3,861,762 | A | * | 1/1975 | Freedy et al. | .................. | 305/100 |
| 3,907,382 | A | | 9/1975 | Kessinger, Jr. | | |
| 4,406,501 | A | | 9/1983 | Christensen | | |
| 7,100,715 | B2 | | 9/2006 | Mukaino et al. | | |
| 7,128,180 | B2 | | 10/2006 | Polakowski et al. | | |
| 7,237,631 | B2 | | 7/2007 | Livesay et al. | | |
| 7,828,396 | B2 | * | 11/2010 | Weiser | ........................... | 305/145 |
| 7,866,420 | B1 | * | 1/2011 | Claas et al. | .................... | 180/9.1 |
| 7,980,639 | B2 | * | 7/2011 | Matthys | ........................ | 305/109 |
| 2007/0057575 | A1 | | 3/2007 | Brandt et al. | | |

FOREIGN PATENT DOCUMENTS

| EP | 1666345 | 6/2006 |
| JP | 10-100949 A | 4/1998 |
| KR | 20-0442650 Y1 | 12/2008 |

* cited by examiner

*Primary Examiner* — Kip T Kotter
(74) *Attorney, Agent, or Firm* — Finnegan, Henderson, Farabow, Garrett & Dunner LLP

(57) ABSTRACT

A track roller assembly for a track type machine is disclosed. The track roller assembly may have a yoke member with a first arm and a second arm spaced apart from the first arm, and an idler wheel rotatably disposed between the first and second arms of the yoke member. The track roller assembly may also have a frame configured to receive at least a portion of the yoke member, and at least one idler key configured to extend through an opening in the frame and engage a lengthwise slot in at least one of the first and second arms.

20 Claims, 4 Drawing Sheets

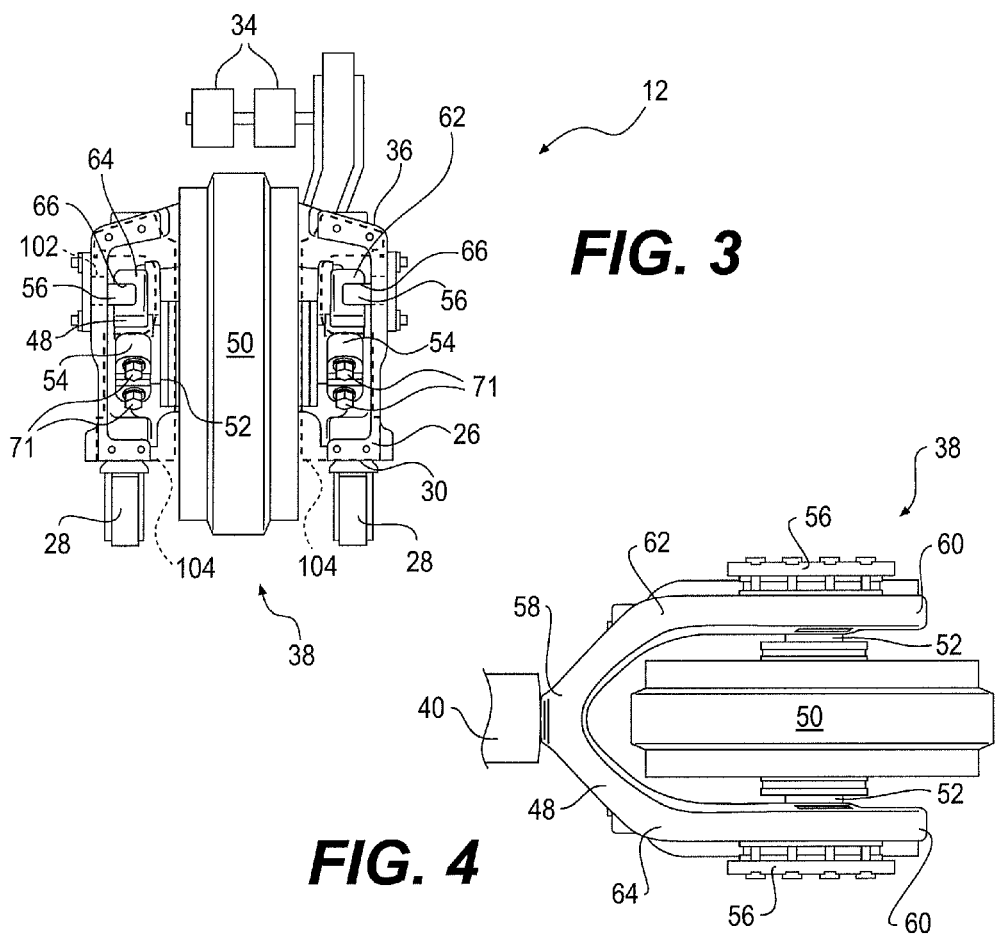
FIG. 3
FIG. 4
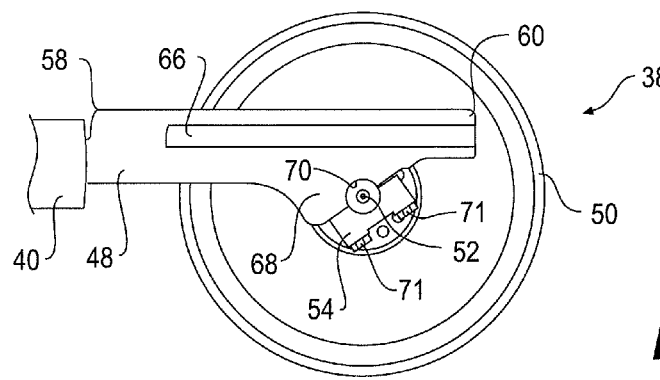
FIG. 5

US 8,870,305 B2

TRACK ROLLER ASSEMBLY HAVING ADJUSTABLE IDLER WHEEL

TECHNICAL FIELD

The present disclosure relates generally to a track roller assembly, and more particularly, to a track roller assembly having an adjustable idler wheel.

BACKGROUND

Track type machines, for example dozers, excavators, and skid-steer loaders, are commonly used in applications where traction is critical or low ground pressure is important. These machines include a frame that supports an internal combustion engine, and left and right undercarriages that transfer power from the engine to a ground surface. The left and right undercarriages are rigidly mounted at one end to the frame and free to pivot in a vertical direction about the mounting location. Each of the undercarriages includes one or more sprockets at the proximal end that are driven by the engine, and an idler wheel located at the distal end and operatively connected to either the frame of the machine or to the sprocket via an idler frame assembly. The idler frame assembly includes a plurality of upper carriers and lower rollers that support an endless track wrapped in a loop around the sprocket and idler. The idler wheel is translationally constrained relative to the sprocket in the transverse and vertical directions, but allowed to move somewhat in a longitudinal direction to accommodate loading of the machine while maintaining a desired tension in the track.

During operation of a track type machine, components of the undercarriage wear, decreasing a distance between a bottom surface of the lower rollers and a periphery of the idler wheel. In some instances, this wear can be significant enough that the idler wheel begins to engage the track improperly and consequently disrupt engagement of the lower rollers with the track. In these situations, performance of the track type machine can be negatively impacted.

One attempt to reduce improper engagement between the idler wheel and the track is disclosed in U.S. Pat. No. 7,237,631 that issued to Livesay et al. on Jul. 3, 2007 ("the '631 patent"). In particular, the '631 patent discloses an idler mounting assembly for a track type work machine. The idler mounting assembly includes a track roller frame, an idler support block disposed proximate an end of the frame, and a removable spacer positioned between the idler support block and the frame to adjust relative positions between the idler support block and the frame. The removable spacer comprises a plurality of identical spacers stored onboard the work machine that are postionable singly or plurally at either of first and second sides of the idler support block to incrementally raise the idler support block relative to the frame as components of the idler mounting assembly wear over time.

Although the removable spacers of the idler mounting assembly disclosed in the '631 patent may allow for improved spacing between worn components of the assembly, use of the spacers may be less than optimal. In particular, the spacers may be difficult to install and difficult to retain in position as the components continue to wear and as the idler translates longitudinally relative to a sprocket of the machine.

The present disclosure is directed to overcoming one or more of the problems set forth above and/or other problems of the prior art.

SUMMARY

In one aspect, the present disclosure is directed to a track roller assembly. The track roller assembly may include a yoke member with a first arm and a second arm spaced apart from the first arm, and an idler wheel rotatably disposed between the first and second arms of the yoke member. The track roller assembly may also include a frame configured to receive at least a portion of the yoke member, and at least one idler key configured to extend through an opening in the frame and engage a lengthwise slot in at least one of the first and second arms.

In another aspect, the present disclosure is directed to another track roller assembly. This track roller assembly may include a yoke member having a first arm and a second arm spaced apart from the first arm, and an idler wheel rotatably disposed between the first and second arms of the yoke member. The track roller assembly may also include a frame configured to receive at least a portion of the yoke member, and at least one idler key configured to extend through an opening in the frame and engage the yoke member. When the at least one idler key is mounted to the frame in a first orientation, the yoke member is retained in a first position relative to the frame, and when the at least one idler key is mounted to the frame in a second orientation, the yoke member is retained in a second position relative to the frame.

BRIEF DESCRIPTION OF THE DRAWINGS

FIG. 3 is an end-view pictorial illustration of the track roller assembly of FIG. 2;

FIG. 4 is a top-view pictorial illustration of a portion of the track roller assembly of FIGS. 2 and 3;

FIG. 5 is a side-view pictorial illustration of a portion of the track roller assembly of FIGS. 2-4;

DETAILED DESCRIPTION

Figure 1:
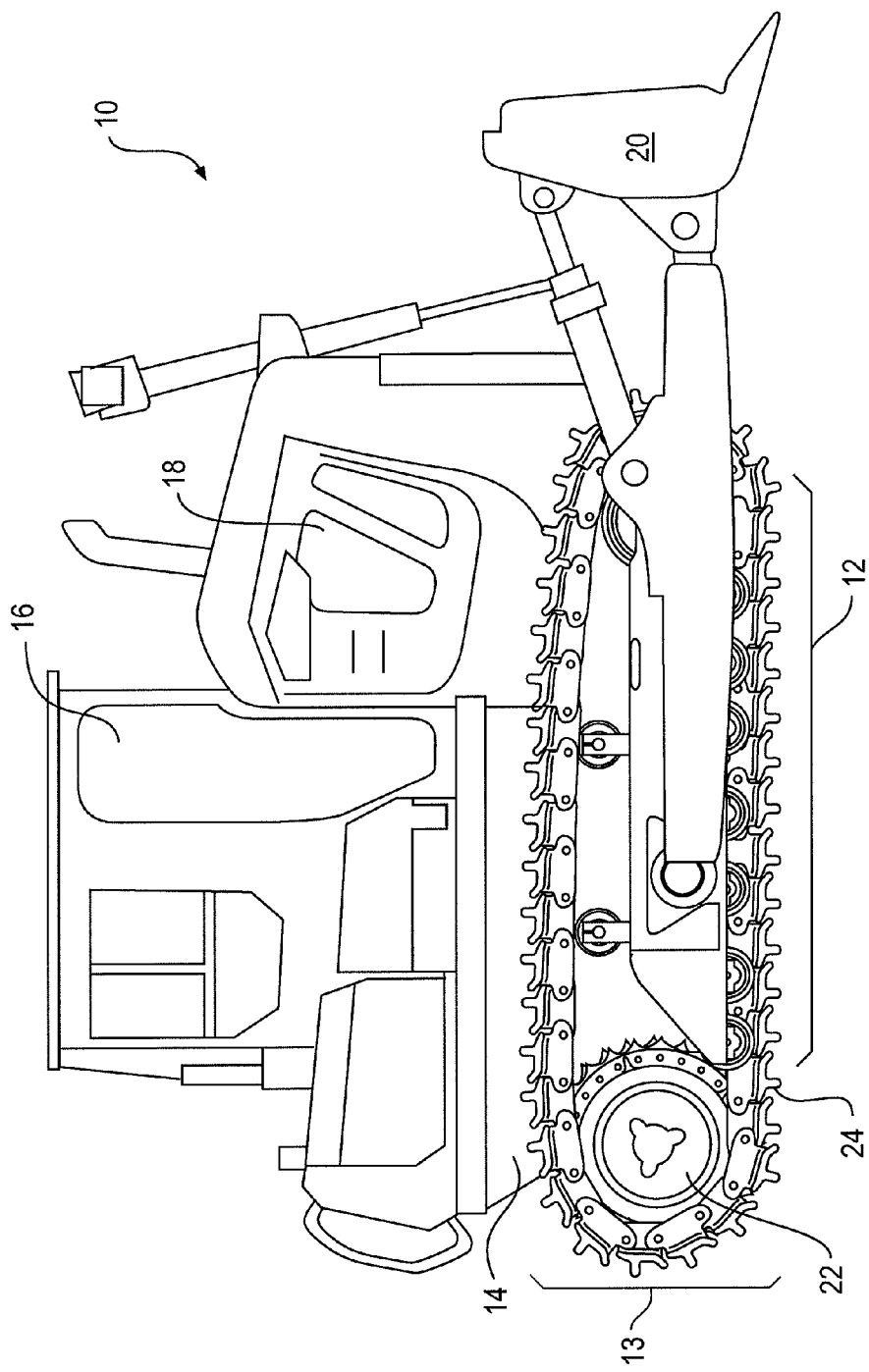
FIG. 1 is a side-view pictorial illustration of an exemplary disclosed track type machine.

FIG. 1 illustrates a track type machine 10 having an exemplary disclosed track roller assembly 12 located within an undercarriage 13 on each side of machine 10 (only one undercarriage 13 is shown in FIG. 1). In accordance with one aspect of this disclosure, machine 10 is illustrated as a dozer. It should be noted, however, that one or more track roller assemblies 12 may be similarly used with another type of tracked machine, if desired. Machine 10 may include a machine frame 14 at least partially defining an operator station 16 and supporting a front-mounted engine 18, and a work tool 20 operatively supported by track roller assemblies 12 at a front end of machine frame 14 proximate engine 18. Engine 18 may generate a power output that can be directed through a sprocket 22 and endless track 24 of undercarriage 13 to propel machine 10 and/or directed through a hydraulic circuit (not shown) to move work tool 20. Operator station 16 may include any number and type of input devices used by an operator for control of engine 18 and/or work tool 20.

Figure 2:
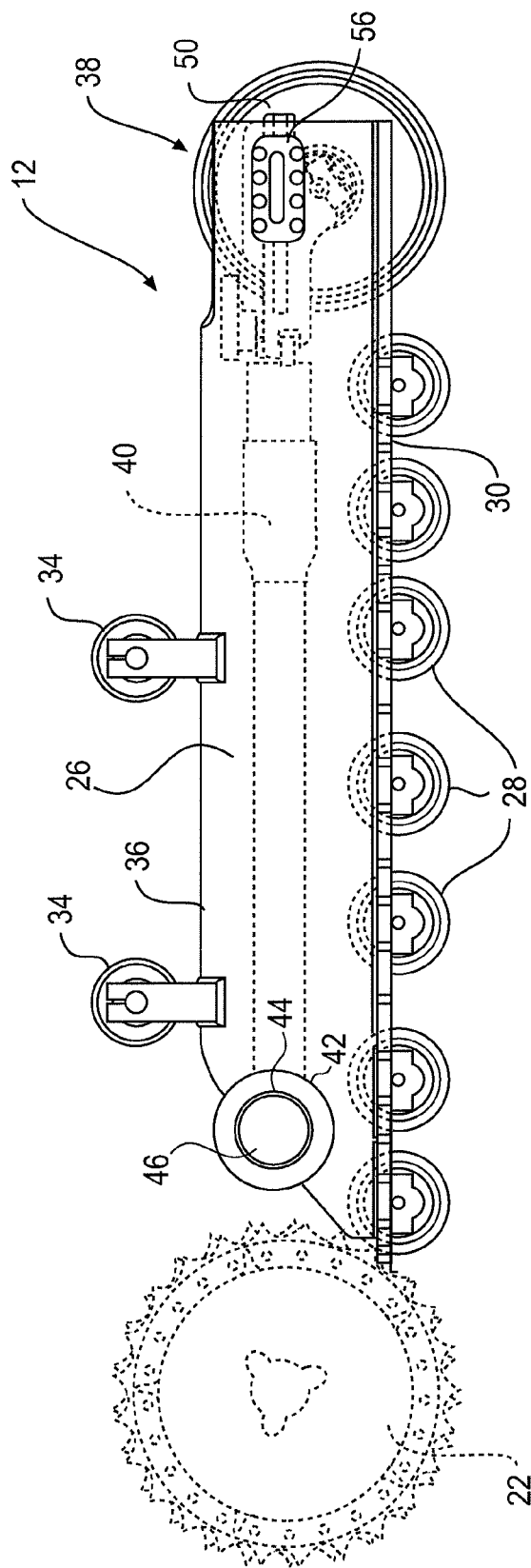
FIG. 2 is a side-view pictorial illustration of an exemplary disclosed track roller assembly that may be used in conjunction with the track type machine of FIG. 1.

As shown in FIG. 2, each track roller assembly 12 may include a plurality of components configured to support endless track 24 (referring to FIG. 1). In particular, track roller assembly 12 may include, among other things, a track roller frame 26, a plurality of lower rollers 28 supported by track roller frame 26 at a lower surface 30, a plurality of upper carriers 34 supported by track roller frame 26 at an upper surface 36 opposite lower rollers 28, and an idler assembly 38 operatively connected to an end of track roller frame 26 opposite sprocket 22. Idler assembly 38 may be constrained from movement in a vertical direction relative to track roller frame 26 (i.e., constrained from moving in a direction between lower and upper surfaces 30, 36) and constrained from moving transversely relative to track roller frame 26 (i.e., in an axial direction of sprocket 22). However, idler assembly 38 may be allowed to move somewhat in a longitudinal direction of track roller frame 26 and may be urged away from track roller frame 26 by a biasing member 40, for example a spring, a grease ram, a gas cylinder, or another track recoil device, as desired. Endless track 24 may wrap around and encircle sprocket 22, lower rollers 28, idler assembly 38, and upper carriers 34.

Track roller frame 26 may form a generally hollow support structure that at least partially houses the remaining components of track roller assembly 12 and transfers loads from endless track 24 and from work tool 20 to machine frame 14 (referring to FIG. 1). In the disclosed embodiment, track roller frame 26 is shown as a single fabricated or cast component. In an alternative embodiment (not shown), track roller frame 26 may include a rear component that supports and at least partially houses lower rollers 28, upper carriers 34, and biasing member 40, and a separate front component that supports and at least partially houses idler assembly 38. In the alternative embodiment, the rear and front components may be joined through any manner known in the art, for example through welding or mechanical fastening. Track roller frame 26 may include a pivot opening 42 and a pivot bearing 44 through which a pivot shaft 46 may extend. Pivot shaft 46 may be rigidly connected at a proximal end to machine frame 14 (referring to FIG. 1), and pivot bearing 44 may rotationally connect track roller frame 26 to a distal end of pivot shaft 46. In one disclosed embodiment, support arms of work tool 20 may connect to machine frame 14 via pivot shaft 46 such that work tool 20 may pivot about shaft 46 during lifting and transfer loads directly to machine frame 14. In other embodiments, however, the support arms of work tool 20 may connect to track roller frame 26 at another location (e.g., at a location forward of pivot shaft 46) such that loads from work tool 20 can be transferred to pivot shaft 46 indirectly via track roller frame 26. Biasing member 40, in a manner similar to the support arms of work tool 20, may also be connected at one end (i.e., the end of biasing member 40 opposite idler assembly 38) to machine frame 14 via pivot bearing 44 and pivot shaft 46.

As shown in FIGS. 2 and 3, lower rollers 28 may be arranged in two spaced-apart vertical rows that extend in a lengthwise direction of track roller frame 26. Each row of lower rollers 28 may be located at a transverse edge of lower surface 30 and configured to engage opposing sides of a centralized chain of bushings at an inside surface of endless track 24. In this manner, lower rollers 28 may function as lower guides for the bushing chain. It should be noted however, that other designs for lower rollers 28 may also be utilized, if desired.

Upper carriers 34, similar to lower rollers 28, may also be arranged into two rows that extend in a lengthwise direction of track roller frame 26. However, in contrast to lower rollers 28, upper carriers 34 may be fewer in number, located adjacent each other, and cantilevered from one side of upper surface 36 to support the bushing chain described above. It should be noted that other designs for upper carriers 34 may also be utilized, if desired.

As shown in FIGS. 3-5, idler assembly 38 may include a yoke member 48, an idler wheel 50, a shaft 52, a pair of end caps 54, and a pair of idler keys 56. Yoke member 48 may be rigidly connected at a stem end 58 to biasing member 40, such that yoke member 48 may pivot somewhat in a vertical plane about pivot shaft 46 (i.e., via biasing member 40) and transfer longitudinal loads from endless track 24 through biasing member 40 to machine frame 14. Idler wheel 50 may be connected to a branch end 60 of yoke member 48 via shaft 52 (e.g., between yoke member 48 and endless track 24). End caps 54 may engage yoke member 48 to retain shaft 52. Idler keys 56 may be used to position yoke member 48 relative to lower rollers 28.

Yoke member 48 may include at branch end 60 a first arm 62 and a second arm 64 spaced apart from first arm 62 in the transverse direction of track roller assembly 12. Yoke member 48, in the disclosed embodiment, is shown as a cast iron or cast steel component having slots 66 machined into outer surfaces of each of first and second arms 62, 64 such that a cross-section (shown in FIG. 3) of each of first and second arms 62, 64 may be generally C-shaped. It is contemplated, however, that yoke member 48 may alternatively be a fabricated steel component with slots 66 being machined or fabricated, as desired. Slots 66 may each have a generally square cross-section, although other shapes (e.g., circular or triangular) are also contemplated. A shaft support 68 (referring to FIG. 5) may extend from a lower surface of each of first and second arms 62, 64, and a partial bore 70 may be machined into each shaft support 68 to receive shaft 52. Partial bore 70, in the disclosed embodiment, may be a half-bore configured to transfer rearward- and upward-directed forces from shaft 52 into yoke member 48. End caps 54 may engage shaft supports 68 and retain shaft 52 in position within partial bores 70 via one or more fasteners 71. As described above, yoke member 48 may be movable in the longitudinal direction (i.e., into and out of track roller frame 26 in a direction of slots 66) such that idler wheel 50, which may be connected between first and second arms 62, 64, may be biased outward against endless track 24 by biasing member 40 and yet still capable of inward movement to cushion and/or accommodate significant loads that might otherwise cause components of track roller assembly 12 to fail. Some or all of yoke member 48 may be hardened through any manner known in the art such that machined surfaces of at least slots 66 may have a Rockwell Hardness of about 50-60 C. It is contemplated, however, that the hardness of yoke member 48 may vary significantly for particular applications and, in some situations, may not require an additional hardening process.

It should be understood that reference to partial bore 70 and the unique configuration of end caps 54 refer to a specific embodiment of the disclosed idler assembly 38. One skilled in the art will appreciate, however, that other configurations can exist in assemblies. For example, yoke member 48 may be provided with a bore of a different geometry, for example a full bore, if desired, and/or cap members 54 could be configured to engage yoke member 48 and/or retain shaft 52 in a different manner, if desired. It is intended that this disclosure also encompasses those and other embodiments.

For the purposes of this disclosure, a machined surface may be considered a surface achieved through a material removal process to achieve a desired geometry. Conventional machining processes include, without limitation, turning, boring, drilling, milling, broaching, sawing, shaping, planing, reaming, tapping, grinding, discharge machining, electrochemical machining, electron beam machining, photochemical machining, and ultrasonic machining. In contrast to a machined surface, a fabricated or cast surface may be a surface created through a material addition process. For example, a fabricated surface may be created through assembling of separate component parts (e.g., via mechanical fastening, adhesives, welding, brazing, or bending). A cast surface may be created when a molten material is deposited within a mold and cooled to a solid state in a particular geometric design.

Shaft 52 may pass through a center of idler wheel 50 and engage partial bores 70 of shaft supports 68 to rotationally retain idler wheel 50 between first and second arms 62, 64. A majority of the periphery of idler wheel 50 may protrude from track roller frame 26 to engage the chain of bushings at the inner surface of endless track 24 (referring to FIG. 1). In the disclosed embodiment, idler wheel 50 has a smooth outer surface configured to ride within a grove of the bushing chain. In other embodiments, however, the outer surface of idler wheel 50 may include gear or sprocket teeth that directly engage individual bushings in the chain, if desired.

One or more guards may be associated with idler assembly 38. For example, two guards 104 (shown in transparency in FIG. 3) may be configured to engage an end of track roller frame 26, at either side of idler wheel 50. In the disclosed embodiment, guards 104 may include openings at ends of first and second arms 62, 64 of yoke member 48 such that, when yoke member 48 is biased away from track roller frame 26, the ends of first and second arms 62, 64 may protrude through the openings. It is contemplated that other guards may also be utilized, if desired, such as guards (not shown) that are positioned below idler wheel 50 to help protect idler wheel from debris being pushed upward toward idler wheel 50 by endless track 24.

Figure 6:
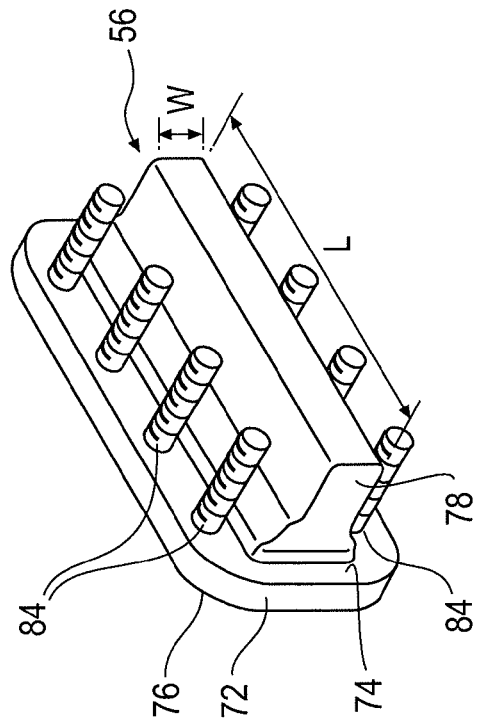
FIG. 6 is an isometric illustration of an idler key that may be used in conjunction with the track roller assembly of FIGS. 2-5.
Figure 7:
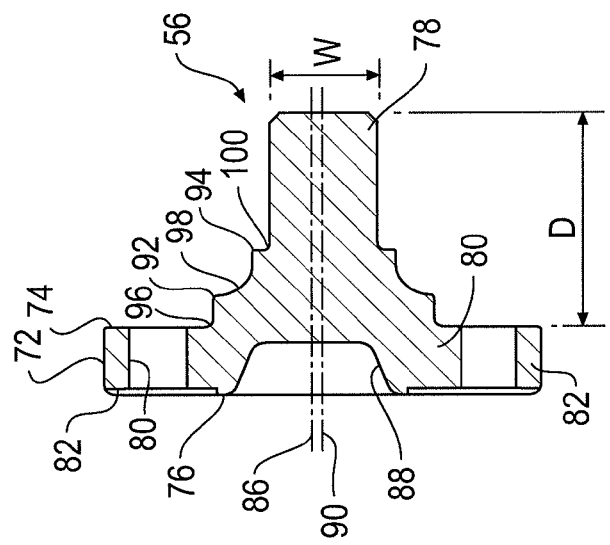
FIG. 7 is a side-view pictorial illustration of the idler key of FIG. 6

As shown in FIGS. 6 and 7, each idler key 56, in the disclosed exemplary embodiment, may be a cast iron, cast steel, or fabricated steel component having multiple machined and hardened surfaces. For example, each idler key 56 may generally include a flange portion 72 having substantially parallel internal and external machine surfaces 74, 76, respectively. A protrusion 78 may extend from internal surface 74 in a direction generally orthogonal to internal surface 74. Some or all of idler key 56 may be hardened through any manner known in the art such that machined surfaces of at least protrusion 78 may have a Rockwell Hardness of about 30-40 C. In this manner, the hardness of slots 66 within yoke member 48 may have a hardness about 40-60% greater than the hardness of protrusion 78, allowing for a majority of the wear caused by engagement between idler keys 56 and slots 66 to occur within idler keys 56, which may be more easily and economically serviced. As with yoke member 48 described above, it is contemplated that the hardness of idler key 56 may also vary significantly for particular applications and, in some situations, may not require an additional hardening process.

Flange portion 72 may be generally plate-like, and include two rows of holes 80 positioned at upper and lower sides. In the disclosed embodiment, each row of holes 80 may extend in a lengthwise direction of flange portion 72 and consist of four spaced-apart holes 80, although any number and/or pattern of holes 80 may be included. A concentric countersunk recess 82 may be located within external surface 76 at each hole 80 to receive a fastener 84 that is inserted through hole 80 from external surface 76 past internal surface 74 to engage track roller frame 26 (referring to FIGS. 2 and 3). A first virtual centerplane of symmetry 86 may be located about halfway between the rows of holes 80 and generally aligned with a widthwise center of flange portion 72. In the disclosed embodiment, a central recess 88 (shown only in FIG. 7) may be located within external surface 76 of flange portion 72, at a base area of protrusion 78. Central recess 88 may allow for a reduction in weight and/or cost of idler key 56, while also providing a sheltered location for branding, parts identification, and/or installation instructions (e.g., which way up, bolt torque requirements, etc.), if desired.

Protrusion 78 may be positioned between the rows of holes 80 located within flange portion 72 and generally have a width dimension W, a length dimension L, and a depth dimension D. In the disclosed exemplary embodiment, the length dimension L of protrusion 78 may be elongated and at least twice the width dimension W. In this same embodiment, the width dimension W may be about 40-60 mm, the depth dimension D may be about 50-70 mm, and the length dimension L may be about 150-200 mm. These dimensions may allow for a greater amount of vertical support for yoke member 48, while reducing a required width dimension and/or slot depth dimension of a mating feature of yoke member 48, as will be explained in more detail below. As seen in the cross-section of FIG. 7, a widthwise virtual centerplane of symmetry 90 of protrusion 78 may be offset by an amount from centerplane 86 of flange portion 72, such that protrusion 78 may be located closer to one lengthwise side of flange portion 72 (and closer to one row of holes 80 in flange portion 72) than to an opposing side of flange portion 72 (and the opposing row of holes 80 in flange portion 72). In the disclosed embodiment, centerplane 90 may be offset from centerplane 86 by about 2-10 mm.

The cross-section of protrusion 78 may be generally stepped and include, for example, a first step 92 and a second step 94. First step 92 may extend around an entire periphery of protrusion 78 and join to internal surface 74 of flange portion 72 with a first radius 96. Second step 94 may be located between first step 92 and machined outer surfaces of protrusion 78, and be located inward of first step 92 (i.e., have a length and a width less than a length and a width of first step 92). Second step 94 may join to first step 92 with a second radius 98, and join to outer surfaces of protrusion 78 with a third radius 100. In the disclosed embodiment, first and third radiuses 96, 100 may be about the same (e.g., about 2-3 mm), while second radius 98 may be larger (e.g., about 8-12 mm). First and third radiuses 96, 100 may be machined surfaces due to mating requirements with other components (e.g., mating requirements with track roller frame 26 and slots 66 in yoke member 48), while second radius 98 may be an as-cast surface. In one embodiment, third radius 100 may only be machined at upper and lower portions of protrusion 78 (e.g., at locations where protrusion 78 engages slots 66), and include as-cast surfaces at side portions of protrusion 78 (e.g., at locations where protrusions 78 may not engage another component).

Protrusion 78 may include at least two machined outer surfaces. In particular, protrusion 78 may include a machined upper surface that extends in a length direction of protrusion 78, and a machined lower surface that is generally parallel to the upper surface. The upper and lower surfaces of protrusion 78 may be generally parallel with centerplane of symmetry 86 and opposing lengthwise sides of flange portion 72. These surfaces may be machined in order to obtain a precision sliding fit within slots 66 of yoke member 48. For similar reasons, an end surface of protrusion 78 may also be machined. It is contemplated that the side surfaces that extend in the width direction of protrusion 78 may or may not be machined, as desired.

Idler keys 56 may be configured to mount to track roller frame 26 and engage slots 66 in yoke member 48 to position idler wheel 50 at a desired distance (i.e., at a desired vertical height) relative to lower rollers 28 (referring to FIG. 2). In particular, track roller frame 26 may include an opening 102 (shown only in FIG. 3) on each side, through which protrusions 78 of opposing idler keys 56 may extend to engage slots 66 on opposing arms of yoke member 48. Internal surface 74 of each flange portion 72 may mate against an external surface of track roller frame 26, and fasteners 84 may pass through holes 80 in flange portion 72 to engage threaded bores (not shown) in track roller frame 26. In one embodiment, holes 80 may be oversized, such that loading of idler wheel 50 by endless track 24 may urge machined outer-surfaces of first step 92 against internal surfaces of opening 102 and transfer loads directly from idler keys 56 to track roller frame 26 instead of passing the load through the joint interface at fasteners 84. In the same or another embodiment, a machined end-surface of second step 94 may be configured to engage the external surfaces of yoke member 48 adjacent slots 66 before a tip end of protrusion 78 engages a back surface of slots 66, thereby maintaining a clearance space (not shown) between the tip end of protrusion 78 and the back surface of slot 66 that facilitates sliding of yoke member 48 relative to track roller frame 26. Chamfers located around a tip-end periphery of protrusion 78 may facilitate assembly of idler keys 56 into track roller frame 26 and/or into slots 66 of yoke member 48.

INDUSTRIAL APPLICABILITY

The disclosed track roller assembly may be applicable to any track type machine where support and/or adjustability of an idler wheel is desired. The disclosed track roller assembly may provide support for an idler wheel through use of two opposing idler keys that engage slots in an associated yoke member that holds the idler wheel. Adjustability may be provided through the use of reversible idler keys that include an offset. Assembly and adjustment of track roller assembly 12 will now be explained.

To set an original position of yoke member 48 relative to lower rollers 28, a service technician may elevate yoke member 48 and connected idler wheel 50 to an approximate desired position, and then insert protrusion 78 of one idler key 56 through opening 102 in a first side of track roller frame 26 and into the corresponding slot 66 in one of first and second arms 62, 64 of yoke member 48. The orientation of idler keys 56 during insertion should be the same for each idler key 56, and correspond with either a new installation or an adjustment installation. For a new installation, each idler key 56 should be oriented such that centerplane 90 of protrusion 78 is below centerplane 86 associated with the rows of holes 80. In this orientation, yoke member 48 may be held closer to lower rollers 28, relative to the reverse orientation. In contrast, for an adjustment installation, each idler key 56 should be oriented such that centerplane 90 of protrusion 78 is above centerplane 86. In this second orientation, yoke member 48 may be held further from lower rollers 28. Instructions (e.g., arrows and/or wording such as "New" or "Worn") may be provided within recess 88 of each idler key 56 to help ensure correct orientation of idler keys 56. After insertion of protrusion 78 into slot 66 in the desired orientation, fasteners 84 may be passed through holes 80 in flange portion 72 and into threaded bores within the outer surface of track roller frame 26. The remaining idler key 56 may then be assembled in similar manner to the opposing side of track roller frame 26 and into slot 66 in the other of first and second arms 62, 64.

The adjustment installation, used in conjunction with worn components of track roller assembly 12, should result in about the same positioning of idler wheel 50 relative to lower rollers 28 after about a quarter-life of machine 10, as originally existed when the components of machine 10 were new. That is, by rotating idler keys 56 by 180 degrees, yoke member 48 may be moved vertically by about twice the offset distance between centerplanes 86 and 90. For example, for a given offset of about 2-10 mm, reorienting idler keys 56 during the adjustment installation should raise yoke member 48 by about 4-20 mm. Reorientation of idler keys 56, in an exemplary disclosed embodiment, may be intended to occur at about the quarter-life service interval of machine 10, and idler keys 56 may be replaced with new idler keys 56 at about a half-life service interval.

The disclosed idler keys 56 may provide for simplified and sure positioning of yoke member 48, while still allowing relative movement between track roller frame 26 and yoke member 48 in the longitudinal direction. In particular, idler keys 56 may be designed to fit within openings 102 of track roller frame 26 in only one of two discrete positions, and idler keys 56 may include instructions associated with both positions. In addition, significant vertical and transverse movement of idler keys 56 after assembly may be substantially inhibited by engagement with openings 102 of track roller frame 26, yet slots 66 that engage protrusions 78 of idler keys 56 may still allow for relative sliding between idler keys 56 and yoke member 48.

It will be apparent to those skilled in the art that various modifications and variations can be made to the disclosed track roller assembly. Other embodiments will be apparent to those skilled in the art from consideration of the specification and practice of the disclosed track roller assembly. For example, it may be possible to provide idler assembly 38 with idler keys that are not reversible and/or do not have an offset. In this situation, the idler keys may function only to support the associated yoke member and, when worn, may be replaced with the same or another idler key have different dimensions and/or geometry. It is intended that the specification and examples be considered as exemplary only, with a true scope being indicated by the following claims and their equivalents.

What is claimed is:
1. A track roller assembly, comprising:
a yoke member having a first arm and a second arm spaced apart from the first arm;
an idler wheel rotatably disposed between the first and second arms of the yoke member;
a frame configured to receive at least a portion of the yoke member; and
at least one idler key configured to extend through an opening in the frame and engage a lengthwise slot extending along a longitudinal axis of at least one of the first and second arms.
2. The track roller assembly of claim 1, wherein:
when the at least one idler key is mounted to the frame in a first orientation, the yoke member is retained in a first position relative to the frame; and
when the at least one idler key is mounted to the frame in a second orientation, the yoke member is retained in a second position relative to the frame.
3. The track roller assembly of claim 2, further including:
a plurality of lower rollers supported by the frame; and
an endless track looped around the idler wheel and the plurality of lower rollers,
wherein reorienting the at least one idler key from the first orientation to the second orientation changes a distance between the idler wheel and the plurality of lower rollers.

4. The track roller assembly of claim 1, wherein:
the at least one idler key includes a flange that mates against an external surface of the frame; and
the track roller assembly further includes a plurality of upper fasteners and a plurality of opposing lower fasteners that retain the flange against the frame.

5. The track roller assembly of claim 4, wherein:
the at least one idler key includes a line of symmetry passing between the pluralities of upper and lower fasteners; and
the line of symmetry is closer to the plurality of upper fasteners than the plurality of lower fasteners.

6. The track roller assembly of claim 5, wherein the line of symmetry is offset from a centerline between the pluralities of upper and lower fasteners by a first amount; and
reorienting the at least one idler key from a first orientation to a second orientation moves the yoke member by a distance about equal to twice the first amount.

7. The track roller assembly of claim 6, wherein the first amount is in a range of about 2-8 mm.

8. The track roller assembly of claim 1, wherein:
the at least one idler key includes a first idler key configured to engage the first arm; and
a second idler key configured to engage the second arm.

9. The track roller assembly of claim 1, wherein:
the first and second arms each include a partial bore; and
the track roller assembly further includes:
    a shaft extending between the partial bores of the first and second arms and configured to support the idler wheel;
    a first cap configured to engage the first arm and retain a first end of the shaft; and
    a second cap configured to engage the second arm and retain a second end of the shaft.

10. The track roller assembly of claim 9, further including at least one guard located at an end of the frame and configured to substantially enclose the shaft.

11. The track roller assembly of claim 10, wherein the at least one guard includes an opening to provide clearance for an end of at least one of the first and second arms.

12. The track roller assembly of claim 1, wherein engagement surfaces of the lengthwise slot are harder than engagement surfaces of the at least one idler key.

13. The track roller assembly of claim 12, wherein the engagement surfaces of the lengthwise slot are about 40-60% harder than the engagement surfaces of the at least one idler key.

14. The track roller assembly of claim 1, wherein the yoke member is constrained from movement in vertical direction and a transverse direction relative to the frame, and allowed to move in a lengthwise direction of the frame.

15. The track roller assembly of claim 14, further including a biasing member disposed within the frame and configured to bias the yoke member away from the frame in the lengthwise direction.

16. The track roller assembly of claim 1, wherein the at least one idler key extends in a length direction of the slot more than in a width direction of the slot.

17. A track roller assembly, comprising:
a yoke member having a first arm and a second arm spaced apart from the first arm;
an idler wheel rotatably disposed between the first and second arms of the yoke member;
a frame configured to receive at least a portion of the yoke member; and
at least one idler key configured to extend through an opening in the frame and engage a lengthwise slot extending along a longitudinal axis of at least one of the first and second arms of the yoke member, wherein:
    when the at least one idler key is mounted to the frame in a first orientation, the yoke member is retained in a first position relative to the frame; and
    when the at least one idler key is mounted to the frame in a second orientation, the yoke member is retained in a second position relative to the frame.

18. The track roller assembly of claim 17, wherein:
the at least one idler key includes a flange that mates against an external surface of the frame;
the track roller assembly further includes a plurality of upper fasteners and a plurality of opposing lower fasteners that retain the flange against the frame;
the at least one idler key includes a line of symmetry passing between the pluralities of upper and lower fasteners; and
the line of symmetry is closer to the plurality of upper fasteners than the plurality of lower fasteners.

19. The track roller assembly of claim 18, wherein the line of symmetry is offset from a centerline between the pluralities of upper and lower fasteners by a first amount; and
reorienting the at least one idler key from a first orientation to a second orientation moves the yoke member by a distance about equal to twice the first amount.

20. A track type machine, comprising:
a machine frame;
an engine supported by the machine frame;
a sprocket driven by the engine;
a track roller frame pivotally connected at one end to the machine frame;
a plurality of lower rollers connected to a lower side of the track roller frame;
a plurality of upper carriers connected to an upper side of the track roller frame;
a yoke member having a first end disposed at least partially within the track roller frame, and first and second spaced apart arms protruding from a second end;
an idler wheel rotatably disposed between the first and second arms of the yoke member;
an endless track wrapped around the sprocket, the plurality of lower rollers, the plurality of upper carriers, and the idler wheel; and
first and second idler keys configured to extend through openings in opposing sides of the track roller frame to engage lengthwise slots extending along longitudinal axes of the first and second arms,
wherein:
    when the first and second idler keys are mounted to the track roller frame in a first orientation, the yoke member is retained in a first position relative to the lower rollers; and
    when the first and second idler keys are mounted to the track roller frame in a second orientation, the yoke member is retained in a second position further away from the lower rollers.

\* \* \* \* \*